June 19, 1962 G. B. MORSE 3,039,800
DRIVE-SLEEVE COUPLING FOR OVERLAPPED THREADED RODS
Filed May 2, 1960
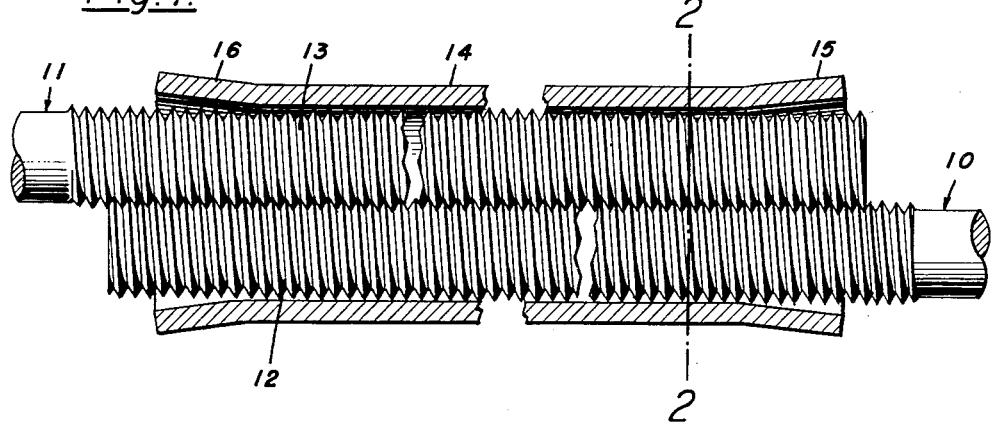
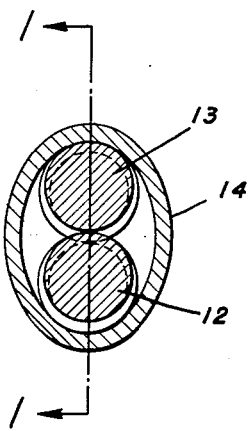
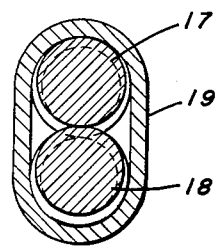
GLENN B. MORSE
*INVENTOR.*

United States Patent Office 3,039,800
Patented June 19, 1962

3,039,800
DRIVE-SLEEVE COUPLING FOR OVERLAPPED THREADED RODS
Glenn B. Morse, Grand Rapids, Mich., assignor to Chester I. Williams, Grand Rapids, Mich.
Filed May 2, 1960, Ser. No. 25,953
7 Claims. (Cl. 287—62)

This invention provides a coupling device for overlapped threaded rods useable when the thread systems of the rods are similar in pitch. The device is intended primarily for use in conjunction with bracing for forms used in pouring concrete. The coupling of rods in overlapping relationship eliminates the necessity of cutting the rods to length with sufficient accuracy to permit the use of known coaxial coupling devices. The alternative to the use of the coaxial devices, according to standard practices, has been welding the rods in overlapped relationship. Welding operation turns out to be very impractical under a wide variety of conditions which are very commonly encountered. The establishment of a connection between such rods may have to be made in locations where it is almost impossible to move and handle welding equipment.

The development of thread-rolling machinery makes it possible to thread a considerable length of the rods without sacrificing a significant amount of the load-carrying capacity of the rod. The present invention utilizes this characteristic by providing for the transfer of load from one rod to the other through the side-by-side engagement of the respective thread systems. This is accomplished through the use of a drive collar or sleeve which closely surrounds the rods and maintains the engagement of the thread systems after the sleeve has been driven into the assembled position.

The several features of this invention will be analyzed in detail through discussion of the particular embodiments illustrated in the accompanying drawing. In the drawing:

FIGURE 1 presents a sectional side elevation of interengaged threaded rods, held in position by a surrounding sleeve.

FIGURE 2 presents a sectional elevation on the plane 2—2 of FIGURE 1.

FIGURE 3 presents a section similar to that of FIGURE 2, but showing a modified form of the invention.

Referring to the drawing, the rods 10 and 11 are threaded as indicated at 12 and 13, respectively, and these threaded sections are shown in overlapping relationship in FIGURE 1 with their respective threads interengaged. The axial length of the interengaged portion may be selected to provide for a transfer of whatever load the rod is capable of sustaining. In bracing for concrete forms, it is desirable to use a severely cold-worked rod in which the ultimate strength and yield point occur very close together. It must be recognized that any side-by-side coupling will have a tendency to rotate slightly as severe stress is applied, which results in a tendency for the ends of the overlapped threaded portions to become slightly disengaged in a manner reminiscent of a "zipper." It can be shown mathematically that it is desirable to maintain an axial length of approximately 5 rod diameters in full engagement in order to provide for effective transfer of the stress of which the rods are capable. The sleeve 14 is preferably of a length selected at about 8 to 10 diameters. The opposite ends 15 and 16 of the sleeve are preferably flared outwardly to facilitate the installation of the sleeve, which creates a reduction in the engaged length of about 1 diameter at each end of the sleeve. The total engaged and gripped length (assuming a sleeve of 10 diameters in length) will then normally be approximately 8 diameters. This will give a safety factor of aapproximately 3 diameters over the minimum of 5 diameters which is theoretically required for the full transmission of the loads involved.

To install the coupling, the overlapped sections of the rods are first separated slightly to permit the sleeve to be inserted over one of them, and moved axially sufficiently to permit the rods to again be brought together. The sleeve is then slipped back so that one of the flared ends begins to move axially over the overlapped portion of the rods. A series of hammer blows will then result in moving the sleeve into the fully engaged position shown in FIGURE 1. In most situations, the hammering will continue until the hammered end of the sleeve becomes flush with the end of the rod.

Referring to FIGURE 2, the conformation of the sleeve 14 is basically elliptical in cross section. This form provides some degree of resilience as the sleeve is forced on the overlapped rods. FIGURE 3, on the other hand, illustrates a modified form of sleeve involving two semi-cylindrical sections connected by parallel sides. The rods 17 and 18 will be held in interengaged relationship in exactly the same fashion as is shown in FIGURES 1 and 2, but the use of the straight-sided sleeve 19 is likely to have some increase in strength for a given thickness of sleeve material in return for a lesser degree of resilience to accommodate variations in tolerance in the threaded diameters of the rods.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A spliced structural member, comprising: first and second rods each having a threaded end-portion of similar pitch, said end-portions being overlapped and having the threads thereof interengaged in side-by-side relationship; and a sleeve having a major internal diameter receiving said overlapped portions in forced fit, said sleeve having an internal dimension transverse to said major diameter which receives the said rods with clearance, said sleeve also having flared ends and a length selected to embrace an overlapped length of said rods of at least five rod diameters.

2. A spliced structural member, comprising: first and second rods each having a threaded end-portion of similar pitch, said end-portions being overlapped and having the threads thereof interengaged in side-by-side relationship; and a sleeve having a major internal diameter receiving said overlapped portions in forced fit, said sleeve having an internal dimension transverse to said major diameter which receives the said rods with clearance, said sleeve also having flared ends.

3. A spliced structural member, comprising: first and second rods each having a threaded end-portion of similar pitch, said end-portions being overlapped and having the threads thereof interengaged in side-by-side relationship; and a sleeve having a major internal diameter receiving said overlapped portions in forced fit, said sleeve having flared ends and a length selected to embrace an overlapped length of said rods of at least five rod diameters.

4. A spliced structural member, comprising: first and second rods each having a threaded end-portion of similar pitch, said end-portions being overlapped and having the threads thereof interengaged in side-by-side relationship; and a sleeve having a major internal diameter receiving said overlapped portions in forced fit, said sleeve having a length selected to embrace an overlapped length of said rods of at least five rod diameters.

5. A spliced structural member, comprising: first and second rods each having a threaded end-portion of similar pitch, said end-portions being overlapped and having the threads thereof interengaged in side-by-side relationship; and a sleeve having a major internal diameter receiving said overlapped portions in forced fit, said sleeve having an internal dimension transverse to said major diameter which receives the said rods with clearance.

6. A spliced structural member, comprising: first and second rods each having a threaded end-portion of similar pitch, said end-portions being overlapped and having the threads thereof interengaged in side-by-side relationship; and a sleeve having a major internal diameter receiving said overlapped portions in forced fit.

7. A spliced structural member, comprising: first and second rods each having a threaded end-portion of similar pitch, said end-portions being overlapped and having the threads thereof interengaged in side-by-side relationship; and a sleeve having a major internal diameter receiving said overlapped portions in close fit.

References Cited in the file of this patent

UNITED STATES PATENTS

| 421,570 | Heiser | Feb. 18, 1890 |
|---|---|---|
| 1,200,000 | McArthur | Oct. 3, 1916 |
| 2,328,294 | Potter | Aug. 31, 1943 |

FOREIGN PATENTS

| 1,174,673 | France | Nov. 3, 1958 |